United States Patent Office 3,114,211
Patented Dec. 17, 1963

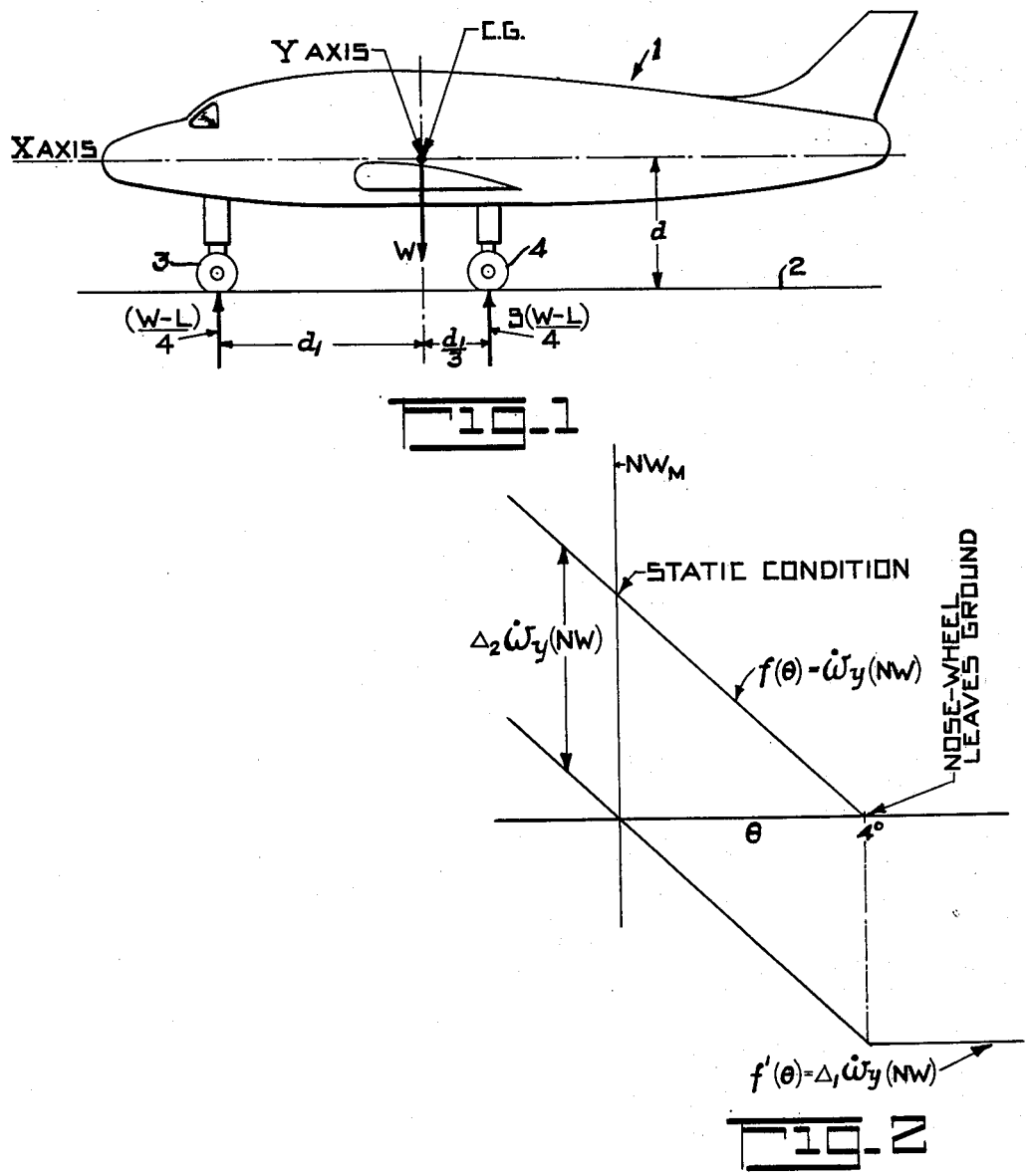

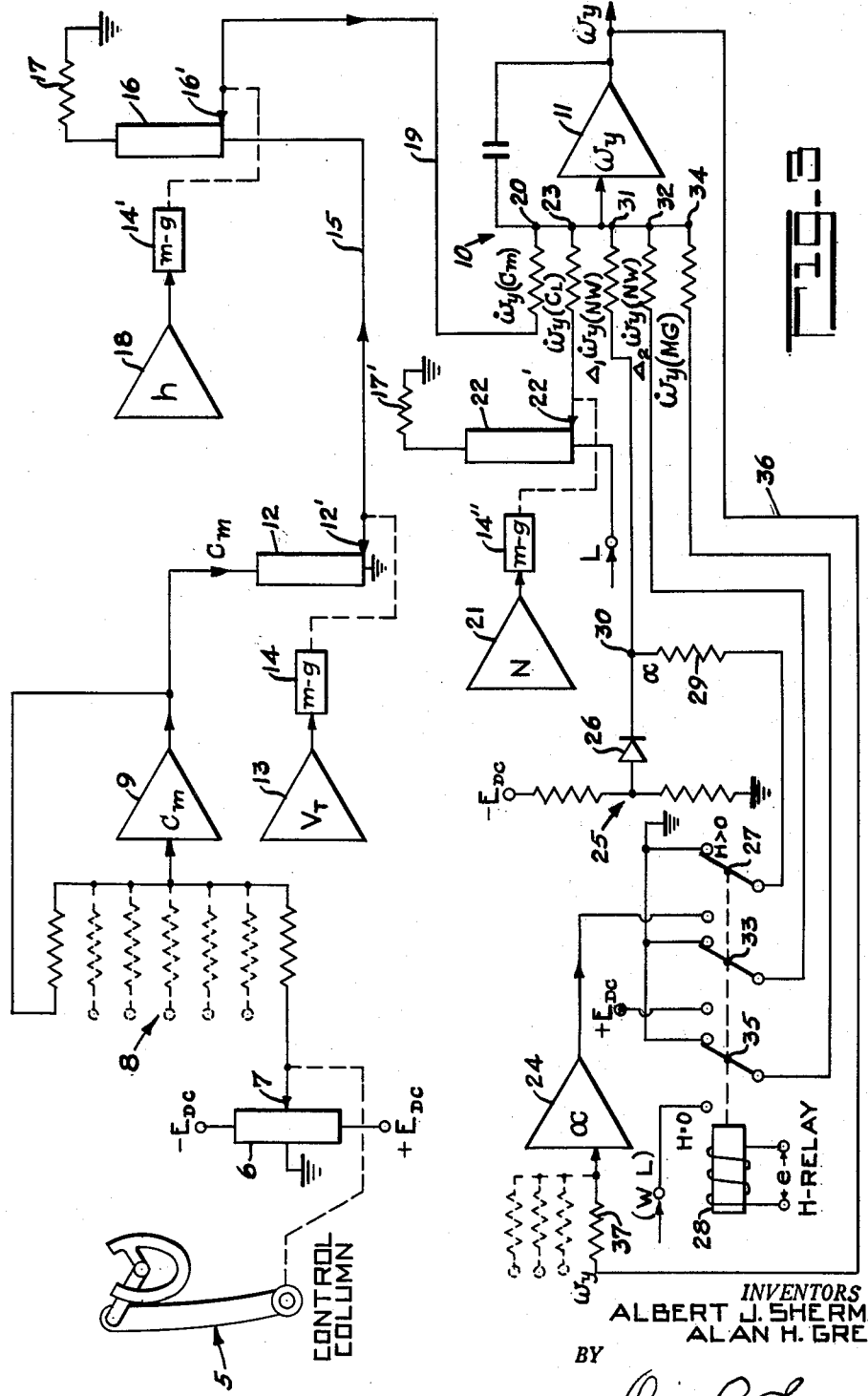

3,114,211
SIMULATION OF PITCHING MOMENT OF AIRCRAFT ON RUNWAY
Albert J. Sherman, Livingston, and Alan H. Green, Passaic, N.J., assignors to Curtiss-Wright Corporation, a corporation of Delaware
Filed Apr. 13, 1961, Ser. No. 102,775
6 Claims. (Cl. 35—12)

This invention relates to aircraft simulating systems, and in particular to the simulation of pitching moment of large aircraft having a nose wheel and main landing gear, especially during the period when the aircraft is in contact with ground prior to and at take-off.

Heretofore, aircraft simulating systems for runway maneuvers including take-off, were designed on a generalization that the nose wheel and main landing gear may be considered as rigid parts of the fuselage. This however, is not the actual case since in practice load springs and air cushion are interpositioned between the fuselage and ground wheels; also there is some tire deflection between the wheels and runway. As the plane picks up speed during the take-off run there will be different rates of expansion of the main gear and nose wheel springs due to aerodynamic lift and pitching moment, so that the fuselage nose will rise somewhat before the nose wheel itself actually leaves the ground. That is, the expansion of the nose wheel spring holds the wheel on the runway during limited rising of the fuselage nose.

Accordingly where these factors are not taken into account, the simulation of airplane performance on the runway will be not only erroneous but misleading as regards the instrument indications on which the pilot bases his actions. That is, the erroneous pitching moment signals produced by the simulator are fed to the simulator's flight computer with the result that other flight factors such as rate of pitch, pitch attitude and angle of attack are erroneously computed. For this reason the "take-off" behavior of flight simulators prior to the present invention has been unsatisfactory.

A principal object of the present invention therefore is an improved aircraft simulating system for representing aircraft behavior on the runway, wherein accurate and realistic simulation of aircraft pitching moment is accomplished.

A further object is to provide an improved simulating system of the above character that is comparatively simple as regards additional circuitry and circuit components, and that is inexpensive as regards additional costs.

The invention will be more fully set forth in the following description referring to the accompanying drawings, and the features of novelty will be pointed out with particularity in the claims annex to and forming a part of this specification.

Referring to the drawings, FIG. 1 is an elementary diagram of an aircraft on the runway indicating weight distribution between the nose and main gear, and moments involved;

FIG. 2 is a chart illustrating the relationship between nose wheel moment and pitch attitude during the take-off run including the point where the nose wheel leaves the runway;

FIG. 3 is a diagrammatic illustration of analog circuitry for carrying out the invention.

A brief comparison of actual aircraft and flight simulator behaviors on take-off is here included for a better understanding of the invention. In an actual aircraft, when near take-off speed on the runway, the pilot eases back on the control column (elevator) and the nose of the plane rises and shortly afterward the plane flies off the ground. In previous simulators however, the pilot had to pull back excessively on the column in order to get the nose "up," as evidenced by the simulated pitch indication of the attitude gyro, with the result that as the nose came up there was serious "overshoot" as compared with the desired gradual and even increase in altitude. This difficulty had previously been considered as due to computed "ground effect" or other factors. However, compensating modification in this direction for improved take-off performance only introduced another problem, namely unrealistic "pitch-down" when approaching the field for a simulated landing, with undesired effects. For this reason, pilots who were familiar with actual flying techniques tended to "over-control" such simulators and therefore objected to its unrealistic behavior.

In accordance with the present invention the lack of analogy between the simulator's landing gear moments and the airplane's moments on take-off is taken into account to solve the problem.

Referring first to FIG. 1 which represents an airplane 1 at rest on a runway 2, it will be assumed that the resultant weight W of the airplane to be simulated is distributed in the ratio of 1:3 between the nose wheel 3 and main landing gear 4. The plane's center of gravity C.G. is located vertically a distance $d$ from the runway, and horizontally at distances $$d_1 \text{ and } \frac{d_1}{3}$$

with respect to the gears 3 and 4, according to the aforesaid ratio. Thus the ground pressures on the respective gear 3 and 4 may be represented by $$\frac{W-L}{4}$$

(where L is lift) and $$3\frac{(W-L)}{4}$$

The following moment equation with respect to C.G. due to landing gear may therefore be used:

$$f(H)\left[d_1\frac{(W-L)}{4} - \frac{d_1}{3}\frac{(W-L)}{4}3\right]=0$$

(Equation I)

where H is airplane altitude with respect to runway.

Thus $f(H)$ equals unity when H is zero, and equals zero when H is greater than zero.

This moment equation rewritten may be expressed as:

$$f(H) = \left[d_1\frac{(W-L)}{4}\cdot f(\theta) - \frac{d_1}{3}\frac{(W-L)}{4}3\right] = My$$

or $$f(H)\left[\frac{(W-L)}{4}d_1(f(\theta)-1)\right]$$

$$=f(H)[0.25\ d_1(W-L).f'(\theta)] = My$$

(Equation II)

where My is the moment with respect to the Y axis of the aircraft, $\theta$ is the aircraft pitch attitude, and $f'(\theta)$ represents a computed function of $\theta$ as illustrated by FIG. 2. Referring now to the graph of FIG. 2, the axes represent respectively the aircraft pitch attitude ($\theta$) and the nose wheel moment ($NW_m$), i.e. $\dot{\omega}_y$, the first derivative of rate of pitch $\omega_y$, which is a moment.

Thus, at the static runway condition, where $\theta$ equals zero, the nose wheel moment can be expressed by the following equation:

$$NW_M = \frac{1}{4}\frac{(W)}{I_y}d_1K \text{ degrees/sec.}^2$$

(Equation III)

where $I_y$ is moment of inertia about the aircraft Y axis and K is a constant.

This moment is shown as decreasing along the curve $f(\theta)$ until it reaches zero where $\theta$ is approximately 4°.

By way of explanation, the curve $f'(\theta)$ follows conventional computing technique in relation to the coordinate axes. The curve is shifted upward by adding a constant $\Delta_2\dot{\omega}_y$ which represents the nose wheel moment ($NW_m$) in the static state of the aircraft on the runway. Thus, the computing curve $f(\theta)$ is represented as showing $NW_m$ at its maximum when pitch is zero, and as decreasing linearly to zero at approximately 4° pitch when the nose wheel leaves the runway. For runway operation, it is assumed that angle-of-attack and pitch are equal, since the flight angle ($\gamma$) is zero i.e. movement is along a horizontal runway.

Simulation of the aircraft behavior in the above described take-off run is accomplished by the system of FIG. 3. An electrical analog system is illustrated for carrying out the invention. In particular, a simulated aircraft control column 5 is mechanically connected as indicated to a signal generator such as a potentiometer (hereinafter for brevity referred to as "pot") 6, at its slider contact 7. The pot has a grounded center tap and is energized at opposite terminals from D.C. voltage sources $+E$ and $-E$ of opposite sense. The signal output representing moment due to elevator deflection, is fed to the input network 8 of a standard $C_m$ computer 9. A detailed description of derivation of the various input signals for this computer is not necessary for an understanding of the present invention, it being sufficient to state that other input signals may represent respectively, moments resulting from simulated angle of attack, rate of pitch, dynamic pressure as determined by air speed and air density, aerodynamic drag due to landing gear, rate of roll, wing flaps deflection, and altitude with respect to runway. The above additional factors may be selected according to relative significance in determining the desired degree of precision of the simulation. A more elementary form of $C_m$ computer having a summing amplifier of type herein shown, is described for example in Patent 2,924,027 granted February 9, 1960 to Robert G. Stern et al.

The output signal from the $C_m$ computer 9 is combined with other signals representing air speed and altitude (air density), and the resultant signal which represents $C_m$ under both runway and flight conditions, is fed together with other signals presently described to respective calibrating resistances of an input network 10 of a rate of pitch computer 11. This computer is a part of the simulator's flight computer system, and its output signal $\omega_y$ is used in the general computation of other flight factors such as pitch attitude and angle of attack, etc. A flight computer system including a $\omega_y$ computer is described for example in Patent 2,731,737 granted January 24, 1956 to Robert G. Stern.

Referring again to the $C_m$ computer, its D.C. output signal $C_m$ is fed to a signal generator or pot 12 of a true air speed ($V_T$) computer 13 that operates the pot slider 12′ through a conventional motor-generator ($m$-$g$) combination 14. The pot is grounded at its lower terminal which represents zero airspeed, and the modified signal derived at slider 12′ is fed by lead 15 to an altitude ($h$) signal generating pot 16. This pot is grounded through a calibrating resistance 17 at its upper terminal and the slider 16′ is operated by the $h$ computer 18 through an $m$-$g$ combination 14′ as indicated. The resultant signal at slider 16′ is fed by lead 19 to terminal 20 of the aforesaid $\omega_y$ input network 10.

Examples of $V_T$ and $h$ computers are shown in the Patent 2,731,737 referred to above.

Another input signal for this network represents a moment due to lift $L$. This signal is in part derived from the engine (turbine) r.p.m. (N) computer 21. In this instance a so-called turbo-prop aircraft is simulated. An example of an N computer is described in Patent No. 2,979,833, dated April 18, 1961, to Roscoe H. Goodwin.

The N computer operates through an $m$-$g$ combination 14″ a signal generating pot 22. The lower terminal thereof is energized by a signal representing moment due to lift, from the simulator's computer. The pot is grounded through a calibrating resistance 17′ at the upper terminal. The moment signal due to lift is combined with the N signal at the slider 22′, from which the resultant signal is fed to the input terminal 23 of the $\omega_y$ computer. The above N factor involves a moment due to propeller slip stream which affects stability to a limited extent.

The main input signal for representing nose wheel moment is derived jointly from circuitry including an angle of attack computer 24, voltage divider 25 and diode 26. The $\alpha$ signal is subject to on-off control at the relay contact 27 of a so-called H (aircraft altitude above runway) relay 28. This relay is energized when H is represented as zero, i.e. aircraft on runway, and is de-energized when H is greater than zero, that is when the aircraft is airborne. The H relay is controlled by signals from a standard flight simulator having a landing and take-off system, as in Patent No. 2,731,737 referred to above. For the on-ground condition the H relay is de-energized, and a negative $\alpha$ signal is fed through contact 27, a calibrating resistance 29 and circuit junction 30 that is turn is connected to the $\omega_y$ input terminal 31. The negative $\alpha$ signal increases with increase of simulated $\alpha$.

The junction 30 is also connected to the output of a biased diode 26 that is energized from the voltage divider 25 as indicated. The diode is biased to its conducting state when the relationship of the divider signal and the $\alpha$ signal at junction 30 corresponds to a pitch angle representing approximately 4°. This is the angle of pitch at which the nose wheel first leaves the runway. The signal from junction 30 thus remains constant at nose wheel rise, notwithstanding continuing increase of the $\alpha$ signal. It is fed to the $\omega_y$ computer at terminal 31 as long as H equals zero, and is cut out at the simulated airborne condition.

For computing purposes, a predetermined constant voltage signal is fed from the D.C. source E′ to the $\omega_y$ input terminal 32 through the input proportioning resistance and H relay contact 33, referring also to FIG. 2. The signal is continued as long as H equals zero and is cut out for the airborne condition. This voltage shifts the curve $f'(\theta)$, FIG. 2, upward to the conventional position $f(\theta)$. The purpose of this predetermined constant D.C. signal is to produce with the signal at junction 30 a resultant signal at the $\omega_y$ computer input that is directly proportional to the nose wheel moment as long as the aircraft is on the runway. For the relationship $\alpha \leq 4°$, the aforesaid resultant signal is proportional to $\alpha$, and as $\alpha$ increases, the resultant signal decreases, thus simulating the elongation of an elastic strut, which, when fully elongated at $\alpha = 4°$, no longer makes contact with ground. Thus for $\alpha \geq 4°$, the resultant signal now equals zero.

For the condition where the nose wheel has lifted from the runway, i.e. $\alpha > 4°$, and the main gear is still on the ground, i.e. $H = 0$, the above-described diode circuitry functions to maintain constant the voltage at junction 30, notwithstanding increase of the $\alpha$ voltage beyond the 4° lift-off point. This now constant ($-$) voltage at junction 30 is exactly balanced by the constant signal $+E_{D.C.}$ from the relay switch 33 so that regardless of the condition of the main gear, the nose wheel moment is represented as zero when the nose wheel is lifted.

In the system shown, the $\omega_y$ inputs are completed by a signal that is fed from the simulator's flight computer through switch 35 of the H relay to the input terminal 34. This signal represents moment due to ($W-L$) at the main gear (MG), and is fed to the computer as long as the aircraft is represented as on the ground. Computation of $W-L$, i.e. net weight on runway, is described for example in the above Patent No. 2,731,737.

It will be seen that the principal landing gear moments are represented as indicated, by signals at the input terminals 31, 32 and 34 of the $\omega_y$ computer. In particular, the nose wheel moment signal at terminal 31 is represented by Equation III as angle of attack $\alpha$ is a fixed function of pitch angle $\theta$ for the onground condition. The nose wheel moment signal at terminal 32 represents the fixed computing factor, $\Delta_2$ $(\omega_y)$, referring to FIG. 2, and the main gear moment at terminal 34 represents $(W-L)$ with respect to the Y axis, referring to Equation I. The combined nose wheel and main landing gear moments at these terminals is represented by Equation II, i.e. the resultant moment $(My)$ with respect to the Y axis.

The $\omega_y$ computer 11 is in the present instance shown as a D.C. integrating amplifier of conventional design. The input signals are algebraically summed and integrated to produce the rate-of-pitch output signal $\omega_y$. Suitable polarity-reversing means may obviously be used where $\omega_y$ signals of opposite sense are required in the flight computer.

The output signal $\omega_y$ in addition to flight computer use, is applied through lead 36 to the input calibrating resistance 37 of the angle-of-attack computer 24 for closure of the pitch loop. Thus, angle-of-attack is computed on the runway as well as during simulated flight.

It will be apparent that the analog system herein shown may alternatively be of the A.C. type as described in the above-cited patents.

It will also be understood that values mentioned, such as landing gear weight distribution and pitch angle at which the nose-wheel leaves the runway are given by way of example only and may vary, depending on the particular airplane simulated.

It should be understood therefore that this invention is not limited to specific details of construction and arrangement thereof herein illustrated, and that changes and modifications may occur to one skilled in the art without departing from the spirit of the invention.

What is claimed is:

1. In flight simulating apparatus having a flight computer for producing signals representing flight factors and forces acting on the aircraft, the flight computer having means for producing an electrical signal that is a function of simulated pitch attitude of the aircraft, means for simulating pitching moment during the take-off run of a simulated flight of aircraft having main and nose wheel landing gear comprising a source of predetermined constant voltage for providing a moment computing signal, means for holding constant said pitch attitude function signal when the pitch attitude function has increased to a predetermined value corresponding to nose wheel rise, the resultant of said attitude function and computing signals representing nose wheel moment, the flight computer also having means for producing a signal that is a function of aircraft weight on runway for representing the main gear moment, the flight computer also having a rate of pitch computer responsive to the aforesaid signals, and means controlled by signals representing aircraft weight and lift from said flight computer and operable in accordance with the simulated on-ground and airborne aircraft conditions respectively for controlling application of said signals to said rate of pitch computer.

2. Apparatus as specified in claim 1 wherein the moment computing signal is of constant value and represents the nose wheel moment in the static on-ground condition of the aircraft, said computing signal also being controlled by said on-ground and airborne condition means.

3. Apparatus as specified in claim 1 wherein the means for producing the nose wheel moment signal includes circuitry including a voltage divider and a biased electric valve for determining the signal according to nose wheel rise at said pre-determined pitch attitude.

4. Apparatus as specified in claim 2 wherein additional moment signals from the flight computer representing respectively co-efficient of moment as primarily determined by simulated elevator deflection combined with a function of simulated air speed, and a moment representing aerodynamic slip-stream effect are applied directly to said rate of pitch computer for both on-ground and airborne computation.

5. Apparatus as specified in claim 1 wherein the means for reducing to zero the resultant nose wheel moment signal at nose wheel rise comprises circuitry having biased uni-directional conducting means, said biased means being responsive to the ratio of magnitudes respectively, of the attitude signal and a fixed signal for holding constant the pitch attitude signal when said signal corresponds to nose wheel rise, whereby the resultant of said attitude signal and the predetermined constant signal of opposite sense, representing nose wheel moment signal applied to the rate of pitch computer, is zero.

6. In apparatus having a flight computer for simulating landing gear pitching moment during a simulated take-off run of aircraft having main gear and nose wheel landing gear, the flight computer having means for producing a signal according to change in a function of simulated pitch attitude for representing the nose wheel rise coincident with simulated expansion of the nose wheel spring as said function of pitch attitude increases, a source of predetermined constant voltage for providing a computing signal, electrical means responsive to the magnitude of the attitude function signal for holding constant said signal at a value corresponding to the pitch attitude function representing nose wheel rise, the resultant of the pitch function and computing signals being zero at nose wheel rise, the flight computer also producing a signal that is a function of aircraft weight on runway representing the main gear pitching moment during the period the aircraft is on ground, the flight computer also having a rate of pitch computer responsive to the aforesaid signals, and relay means controlled by signals representing aircraft weight and lift from said flight computer and operative in response to a simulated airborne condition of the aircraft for cutting out said signals.

References Cited in the file of this patent

UNITED STATES PATENTS

| | | |
|---|---|---|
| 2,701,922 | Dehmel | Feb. 15, 1955 |
| 2,731,737 | Stern | Jan. 24, 1956 |
| 2,858,623 | Stern | Nov. 4, 1958 |
| 2,924,027 | Stern | Feb. 9, 1960 |
| 2,926,431 | Sherman | Mar. 1, 1960 |
| 2,930,143 | Dehmel | Mar. 29, 1960 |